United States Patent [19]
Streib

[11] Patent Number: 6,165,104
[45] Date of Patent: Dec. 26, 2000

[54] SYSTEM FOR CONTROLLING A CLUTCH AND/OR A MOTOR OF A VEHICLE

[75] Inventor: Martin Streib, Vaihingen, Germany

[73] Assignee: Robert Bosch GmbH, Stuttgart, Germany

[21] Appl. No.: 09/209,830

[22] Filed: Dec. 11, 1998

Related U.S. Application Data

[63] Continuation-in-part of application No. 08/767,065, Dec. 16, 1996, abandoned.

[30] Foreign Application Priority Data

Dec. 29, 1995 [DE] Germany ............................ 195 49 081

[51] Int. Cl.[7] ........................................................ F16D 43/04
[52] U.S. Cl. ............................ 477/174; 477/175; 477/166
[58] Field of Search ........................ 477/166, 169, 477/174, 175, 180

[56] References Cited

U.S. PATENT DOCUMENTS

| | | | |
|---|---|---|---|
| 4,484,497 | 11/1984 | Hibino | 477/169 X |
| 4,558,772 | 12/1985 | Grimes et al. | 477/174 X |
| 4,577,737 | 3/1986 | Niikura et al. | 477/174 X |
| 4,624,349 | 11/1986 | Watanabe | 477/175 X |
| 4,667,787 | 5/1987 | Hoffmann | 477/175 |
| 4,732,245 | 3/1988 | Hiramatsu | 477/169 X |
| 4,936,405 | 6/1990 | Hrovat | 477/181 X |
| 4,969,545 | 11/1990 | Hayashi | 477/174 X |
| 5,002,170 | 3/1991 | Parsons et al. | 477/166 X |
| 5,678,674 | 10/1997 | Nehse | 192/103 R |
| 5,709,629 | 1/1998 | Minowa et al. | 477/120 X |
| 5,809,966 | 9/1998 | Streib | 123/399 |
| 5,860,892 | 1/1999 | Korenjak et al. | 477/180 |

FOREIGN PATENT DOCUMENTS

| | | |
|---|---|---|
| 3929986 | 3/1991 | Germany . |
| 4321333 | 1/1995 | Germany . |

OTHER PUBLICATIONS

"Automotive Handbook", third edition (1993), pp. 538 and 539.

*Primary Examiner*—Khoi Q. Ta
*Attorney, Agent, or Firm*—Walter Ottesen

[57] ABSTRACT

The invention is directed to a system for controlling a clutch which is arranged between the motor of a vehicle generating a motor torque and the wheels of the vehicle. With this clutch, and in response to a drive signal, the force flow between the motor of the vehicle and the wheels can at least be reduced. The essence of the invention is that the drive signal of the clutch is formed in dependence upon a signal which represents a change of the motor torque of a specific extent. The invention is also directed to a system for controlling the motor of a vehicle with an adjusting element for influencing the motor torque which can be adjusted at least in dependence upon the detected command torque. When a specific extent of a change of motor torque is present, the execution of the command to adjust the motor torque is delayed. The essence here is that a clutch is arranged between the vehicle motor and the wheels of the vehicle and the delay is actuated in dependence upon a status signal representing the instantaneous operating state of the clutch.

6 Claims, 8 Drawing Sheets

SYSTEM FOR CONTROLLING A CLUTCH AND/OR A MOTOR OF A VEHICLE

RELATED APPLICATION

This application is a continuation-in-part application of patent application Ser. No. 08/767,065, filed Dec. 16, 1996 abandoned, and entitled "System for Controlling a Clutch and/or a Motor of a Vehicle".

BACKGROUND OF THE INVENTION

Automatic clutches or servoclutches are, for example, known from the text entitled "Automotive Handbook", third edition, (1993), pages 538 and 539 as well as from German patent application P 195 40 921 (corresponding to International patent application PCT/DE 96/01347, filed Jul. 23, 1996). Automatic clutches in combination with electronic control apparatus provide either an automated start from standstill or, together with a servo-actuated shifting mechanism, a fully automatic transmission. In such automatic clutches, the disengagement and engagement of the clutch is generally actuated via a servodrive.

In addition to such automatic clutches, automatic transmissions are known wherein the transmission ratio can be changed in response to a drive signal. Such automatic transmissions can, in a manner known per se, be connected to the motor of the vehicle via a hydraulic converter.

It is known that the shifting pressure or the fluctuations in the drivetrain occurring under these circumstances can be attenuated utilizing the converter. The shifting pressure arises with the change of the transmission ratios. The converter can be bridged by a known converter bridge clutch or the bridge can be removed. At higher vehicle speeds or in the upper gears of the transmission, this converter bridge clutch is mostly engaged. In this way, slip losses of the torque converter are prevented and, in this way, the fuel consumption is reduced; however, the effect of the converter in attenuating fluctuations in the drivetrain is not provided when the converter bridge clutch is engaged. In addition, the slip of such converter clutches can be controlled.

Furthermore, it is known to provide a motor control apparatus for controlling the motor of a vehicle by means of which the motor output torque is controlled, for example, in dependence upon the following: driver command, motor operating parameters and additional variables representing or influencing the operation of the vehicle. German patent publication 4,321,333 discloses an electronic accelerator pedal system wherein measures for reducing fluctuations in the drivetrain during the transition from the overrun phase to the drive phase are provided. These measures include that the transition from the overrun phase into the tractive phase is detected and that, when a transition is detected, the execution of the command of the driver for adjusting the power of the internal combustion engine is delayed.

SUMMARY OF THE INVENTION

It is an object of the invention to optimize such systems for reducing the fluctuations in the drive train.

The system of the invention is for controlling a clutch arranged between a motor of a vehicle generating a motor torque ($M_{mot}$) and the wheels thereof. The system includes: a first control apparatus for generating a signal ($\Delta M_{mot}$ and/or $|\Delta Q_i|$) indicating a change of a specific amount of the motor torque ($M_{mot}$); a second control apparatus for forming a drive signal ($P_{wk}$) in dependence upon said signal ($\Delta M_{mot}$) to cause the clutch to at least reduce the power flow between the motor and the wheels; and, the signal ($\Delta M_{mot}$ and/or $|\Delta Q_i|$) indicating whether one of the following is provided:

(a) a change of sign of the motor torque ($M_{mot}$);
(b) an interruption or discontinuous reduction of the fuel metering to the motor ($|\Delta Q_i|$>SW); or,
(c) a resumption of fuel metering or an abrupt increase of the metering of fuel ($|\Delta Q_i|$>SW) after said interruption or said abrupt reduction.

In a first embodiment, the invention proceeds from a system for controlling a clutch which is mounted between a vehicle motor, which generates a motor torque, and the wheels of a vehicle. The force flow between the vehicle motor and the wheels can be changed via this clutch in response to a drive signal. That is, the force flow can, for example, at least be reduced or the rigid coupling between the motor of the vehicle and the wheels can be interrupted. The essence of the first embodiment of the invention comprises that the drive signal of the clutch is formed in dependence upon a signal which represents a change of a specific extent of the motor torque. This first variation of the invention affords the advantage that a disengagement or a control of the converter clutch is effected in time in advance of a significant change of the output torque of the motor. In this way, the converter can remain completely engaged in the lower gears and must not be disengaged or controlled for reasons of comfort because of the drivetrain fluctuations which can possibly occur. This leads to a minimal loss of energy which occurs when the converter clutch is not completely engaged without reducing comfort.

In this variation, the signal, which represents a change of motor torque, can represent a change of the motor torque to be introduced by the motor control and especially an abrupt change of motor torque.

The motor torque is, in general, controlled via a motor control and the clutch is controlled via a clutch or transmission control. It can be provided that the signal, which represents a change of motor torque, is formed in the motor control and is supplied to the clutch control or the transmission control.

The drive signal can be configured in response to a change (especially an abrupt change) of the motor torque which is to be introduced and represented by the signal. The drive signal can be so formed in reaction to this signal that the rigid connection between the vehicle motor and the wheels is interrupted. Whereas this connection is rigid when the converter clutch is engaged, this rigid connection can be disengaged via a disengaged converter clutch (with or without slip).

In the second variation according to the invention, the invention proceeds from a system for controlling a vehicle motor via an actuating element for influencing the motor torque which is adjusted at least in dependence upon the detected command of the driver. When a change of the desired motor torque of a specific extent is present, the execution of the command (for example, driver command and/or tempomat/traveling speed control) for adjusting the motor torque is delayed. The essence of the second embodiment of the invention is that a clutch is mounted between the vehicle motor and the wheels of the vehicle and the delay is actuated in dependence upon a status signal representing the instantaneous operating state of the clutch. This second embodiment of the invention affords the advantage that the delay of the desired command is only then actuated when the converter clutch cannot execute the above-mentioned attenuation (for suppressing the fluctuations in the drivetrain) because the converter clutch is engaged or is not sufficiently disengaged.

In this embodiment of the invention, it is advantageously provided that the above-mentioned status signal indicates the presence of at least one of three operating states. The first operating state is characterized by a disengaged clutch and the second operating state is characterized by an engaged clutch. The third operating state is characterized by a controlled clutch operation.

The motor torque is generally controlled by means of a motor control and the clutch is controlled by means of a clutch or transmission control. Here, it is advantageous that the status signal of the clutch is formed in the clutch control or transmission control and is supplied to the motor control. The first operating state or third operating state (clutch not completely engaged) of the clutch are represented by the status signal. In response to this operating state, the delay executing the driver command to adjust the motor torque cannot be carried out or can be carried out only in the sense of shortening the delay.

For both embodiments, the extent of a specific torque change can be:

(a) a change in sign of the motor torque;

(b) an interruption or an abrupt or discontinuous reduction of the metering of fuel to the engine (for example, in reaction to a detected overrun operation of the engine) and/or;

(c) a resumption of the metering of fuel after an interruption or after a reduction of the metering of fuel to the engine or an abrupt or discontinuous increase of the metering of fuel to the engine (for example, after or at the end of the overrun operation).

As already mentioned, a torque converter can be bridged by means of the clutch or the clutch can be a servo-operated clutch.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
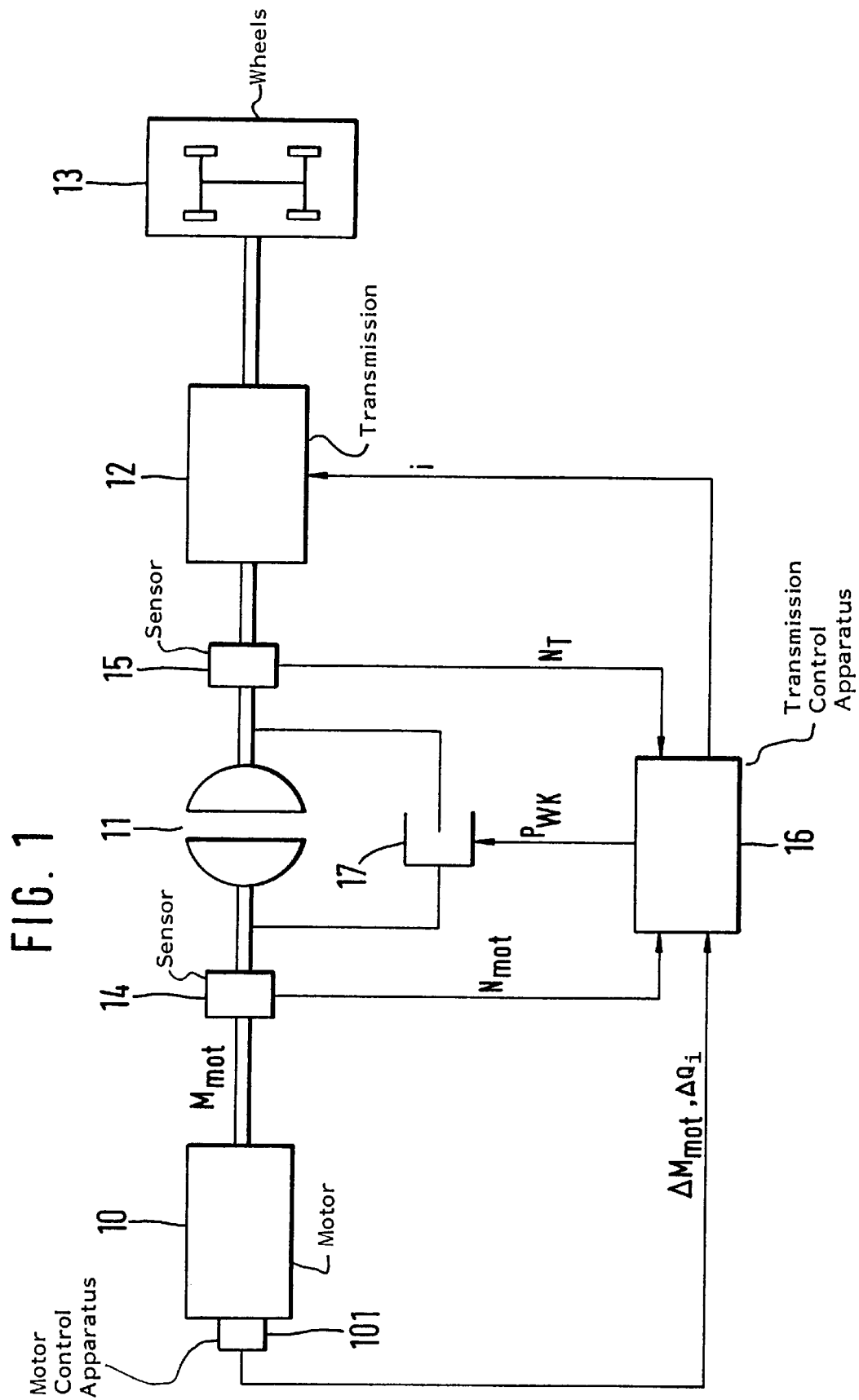
FIG. 1 is a schematic block circuit diagram of a first embodiment of the system of the invention for controlling a clutch arranged between the vehicle motor and the wheels of the vehicle.
Figure 2:
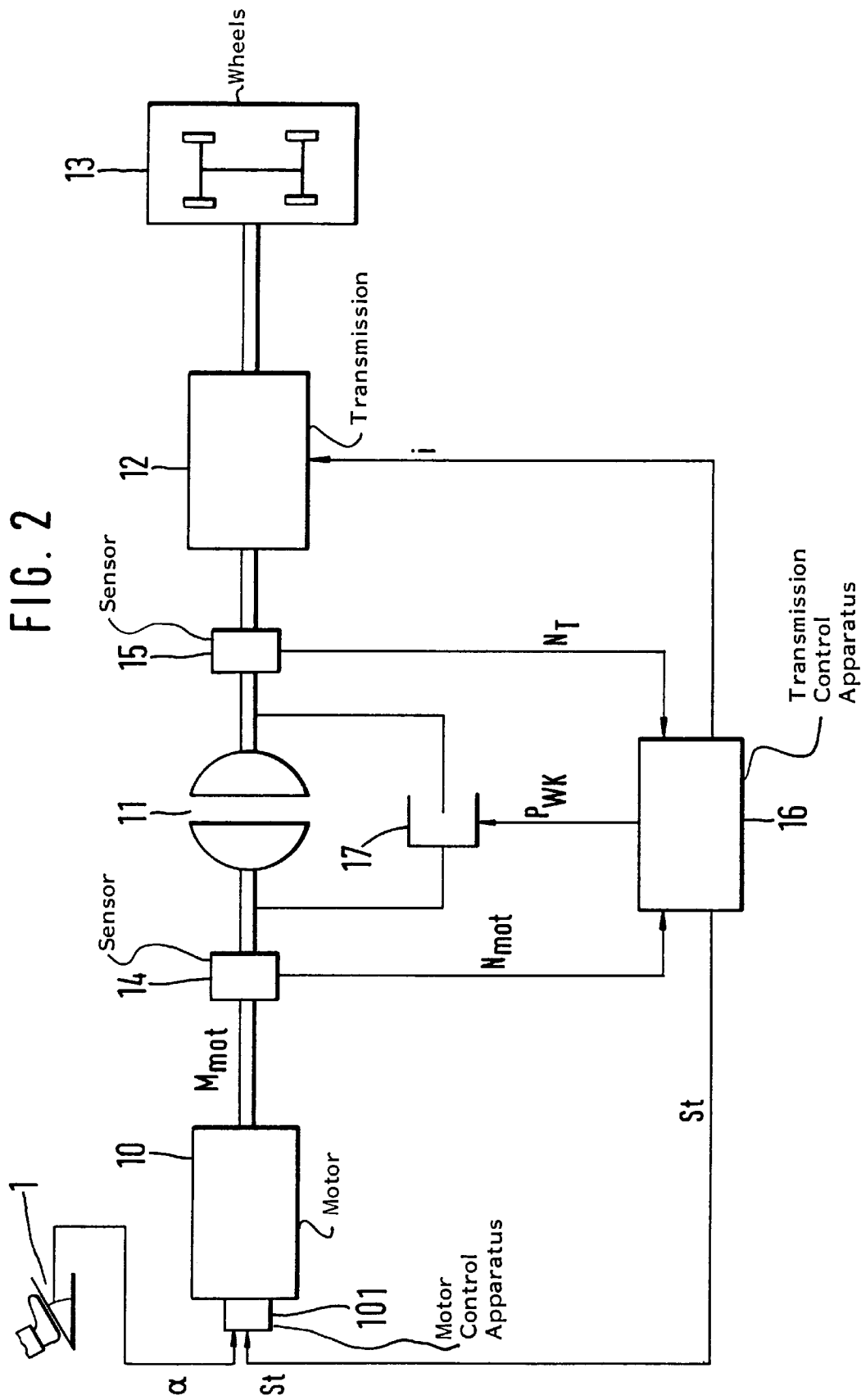
FIG. 2 is a schematic block circuit diagram of a second embodiment of the system according to the invention.

Elements performing the same function are identified by the same reference numerals in FIGS. 1 and 2. In FIGS. 1 and 2, a torque converter is identified by reference numeral 11 and is arranged between a vehicle engine 10 and a transmission 12. The output torque $M_{mot}$ of the engine 10 is supplied to the torque converter 11 via a drive shaft. The converter 11 is connected at its output to the wheels 13 via the transmission 12. In this embodiment, the transmission 12 is an automatic transmission.

The operation of the vehicle engine 10 is controlled via the motor control apparatus 101. Here, it is assumed that the driver issues a drive command. For this purpose, in FIG. 2, the position of an accelerator pedal 1 actuated by the driver is transmitted to the motor control apparatus 101.

The hydromechanically operating converter 11 can be bridged by the clutch 17. The clutch 17 can be completely or partially disengaged via the drive signal $P_{WK}$ or can be engaged. In addition to the transmission ratio i of the transmission 12, the clutch or transmission control apparatus 16 controls the clutch 17. For this purpose, especially the motor rpm $N_{mot}$ and the turbine or converter output rpm $N_T$ are supplied to the clutch or transmission control apparatus 16. The motor rpm $N_{mot}$ is detected via the sensor 14 and the converter output rpm $N_T$ is detected by the sensor 15. To determine the transmission ratio i, generally, the engine load or the drive command of the driver and the road speed are also used (not shown).

As mentioned, the converter bridge clutch 17 can be engaged or disengaged and, in addition, a control of the clutch slip can be provided which is derived, for example, from the ratio of $N_{mot}$ to $N_T$. Most automatic transmissions 12 today include such a converter bridge clutch 17 which is generally engaged in the higher transmission gears in order to minimize increased fuel consumption caused by converter slip. The disadvantage of this bridging is that the jolt damping or drivetrain vibration damping action of the converter 11 is no longer present. Rapid changes of engine torque $M_{mot}$ can then possibly be transmitted almost entirely undamped to the drivetrain of the vehicle which causes the vehicle to tend to shake. This shaking is especially noticeable in the presence of two operating conditions of the engine:

(1) during the transition from normal operation (fired operation with normal fuel metering) to known overrun cutoff (cutoff of the metering of fuel in the overrun operation of the engine) and vice versa when resuming the metering of fuel after an overrun cutoff of this kind. The engine torque $M_{mot}$ increases abruptly in these phases; and, (2) when there is a sign change of the engine torque $M_{mot}$ (transition from overrun operation into the drive operation of the engine) because here the tooth flanks in the drivetrain change their contacts.

In both operating conditions, a distinct change of the motor torque occurs. These changes too can be predicted because these changes are initiated by the motor control apparatus 101. As mentioned, the converter clutch 17 can also be control driven, that is, the clutch is neither entirely engaged nor entirely disengaged in this control state. The clutch pressure is so controlled that the clutch grips with a low slip. The advantage is that the energy losses in the converter are significantly lower than for a disengaged clutch; however, the damping action of the converter is at least still partially effective. However, it is disadvantageous that a certain higher consumption of fuel is unavoidable compared to the completely engaged clutch.

It is essential for the first embodiment of the invention shown in FIG. 1 that the signal $\Delta M_{mot}$ is supplied to the clutch or transmission control apparatus 16 from the motor control apparatus 101. This signal $\Delta M_{mot}$ indicates whether the motor control apparatus 101 controls the motor 10 so that a distinct change of the motor torque $M_{mot}$ is to be expected. In response to a significant change of the motor torque $M_{mot}$ indicated by the signal $\Delta M_{mot}$ (for example, in the sense of the above-mentioned two operating conditions), the clutch 17 is at least partially, and at best however, completely disengaged. When the motor control apparatus 101 wants to carry out an overrun cutoff, a resume operation after an overrun cutoff or a distinct change in sign of the motor torque $M_{mot}$ is to follow, then the motor control apparatus 101 transmits data $\Delta M_{mot}$ to the clutch control 16 based upon which the clutch control 16 switches the converter clutch 17 from the engaged state into the controlled or disengaged state (or from the controlled into the disengaged state). When the action "overrun cutoff", "resume" or "engine torque sign change" actually is carried out, the converter clutch 17 is then no longer engaged so that the torque jump which occurs in this way is damped in the drivetrain by the converter 11. FIG. 1 also shows the signal $\Delta Q_i$ which represents the change of the fuel metering.

At this point, it is noted that a servo-operated clutch, known per se, can be used in lieu of the converter bridge clutch. In this case, the engaged servo-operated clutch is somewhat disengaged for a short time (low clutch slip) to dampen the jolt.

The status signal St is important for the second embodiment of the invention shown in FIG. 2. This status signal St is conducted from the clutch or transmission control apparatus 16 to the motor control apparatus 101 and indicates the operating state (engaged, disengaged, partially disengaged) of the converter bridge clutch 17. In the motor control apparatus 101, a drivetrain damping is provided by means of which the drive command expressed by the actuation of the accelerator pedal 1 is not transmitted further immediately to the power control (for example, the throttle flap). The problem with respect to drivetrain vibrations (for example, in response to a change of sign of the motor torque) can, in a manner known per se (see German patent publication 4,321,333), be solved by means of a so-called EGAS-system by slowly passing through the sign change region, that is, with a decelerated passing through this region.

The EGAS-system pertains to a configuration wherein, for example, the connection from the accelerator pedal to the throttle flap of the engine is not mechanical but is via an electronic circuit so that the throttle flap is actuated electrically. However, if this function in the engine control apparatus 101 is continuously active (that is, without distinguishing whether the converter clutch 17 is engaged, partially disengaged or disengaged), then a double damping via the converter and via the above-mentioned special EGAS function is obtained in the case where the controlled clutch is disengaged or partially disengaged. The consequences resulting from the foregoing can possibly be a relatively lethargic response performance of the vehicle to a movement of the accelerator pedal.

According to the second embodiment of the invention, the status is transmitted to the motor control apparatus 101, for example, in the form of a three-step signal St (clutch disengaged, clutch controlled, clutch engaged). The described function "drivetrain damping" in the motor control apparatus 101 is only activated when the state "clutch engaged" is present. In this way, damping occurs only once:

(1) via the function "drivetrain damping" in the motor control apparatus 101 with the converter bridge clutch 17 engaged; and, (2) via the converter 11 with an entirely or partially disengaged converter bridge clutch 17.

The driver always has a similar response performance to the actuation of the accelerator pedal independently of the state of the converter clutch.

In lieu of switching off the function "drivetrain damping" in the motor control apparatus 101 when the clutch is disengaged or partially disengaged, the clutch can continue to remain active but with other (weaker) parameters (reduced delay of the driver command) than in the engaged state of the clutch.

Figure 3A:
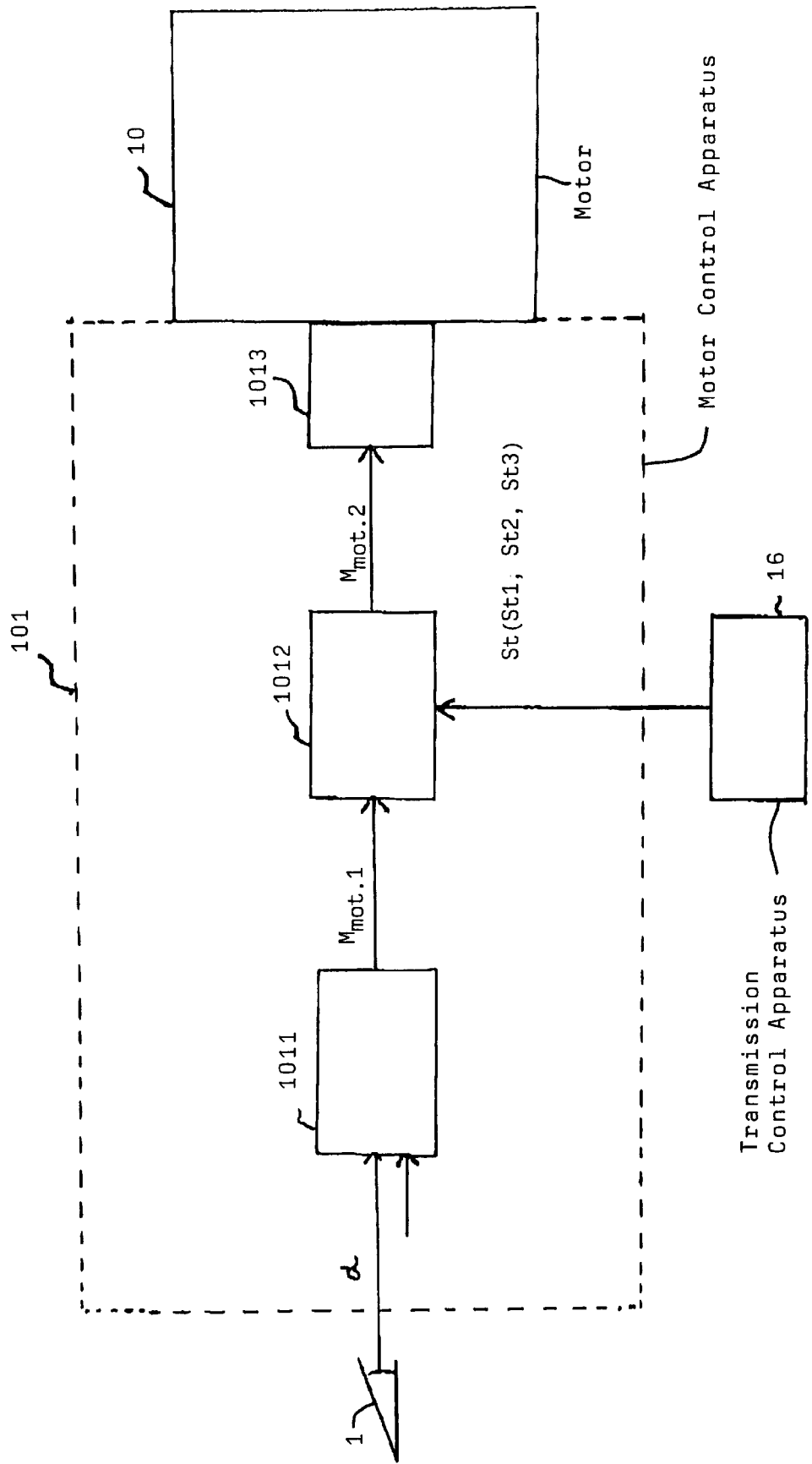
FIG. 3a is a schematic detail block diagram showing the motor control apparatus of the system of FIG. 2.
Figure 3B:
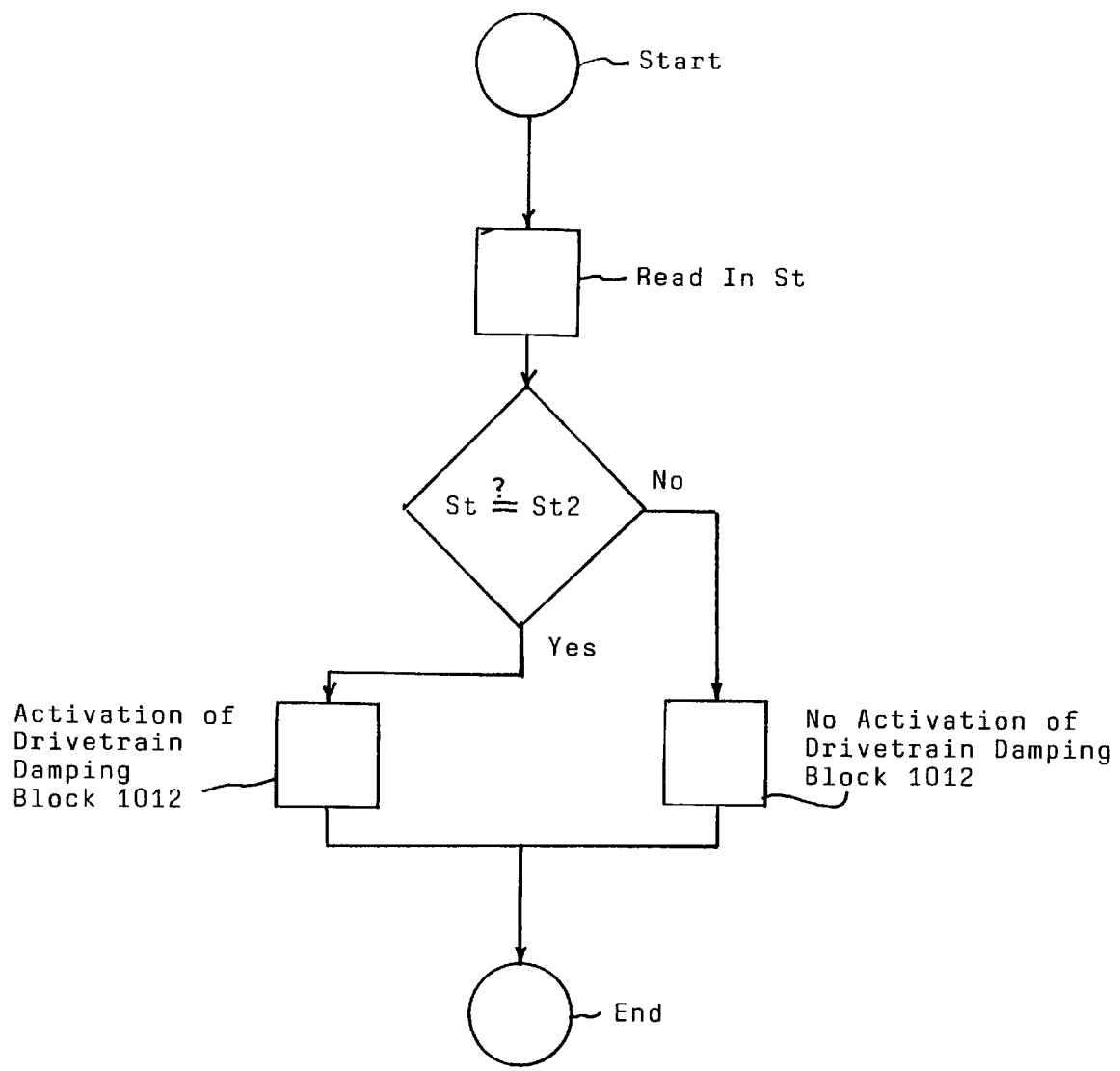
FIG. 3b is a flowchart showing the function of the block 1012 of the motor control apparatus of FIG. 3a; and, FIGS. 4a to 4d are flowcharts showing the function of the transmission control apparatus of the system of FIGS. 1 and 2.

FIGS. 3a and 3b show the time-delay means for time-delaying the issuance of a command torque signal when a change of the command torque signal exceeds a specific amount. The time-delay means is shown in the context of a detail view of the motor control apparatus 101 of FIG. 2.

In FIG. 3a, the accelerator pedal signal $\alpha$ from the accelerator pedal 1 is conducted to the block 1011. The block 1011 determines the desired command torque $M_{mot.1}$ from the signal $\alpha$ as well as from other operating parameters such as the engine rpm and/or the transmission output rpm.

The desired command torque $M_{mot.1}$ is supplied to the function block "drivetrain damping" referred to above (that is, time-delay 1012). Here, the desired command torque $M_{mot.1}$ is modified in dependence upon the status signal St and, in this way, the modified desired command torque $M_{mot.2}$ is formed. This modification takes place in such a manner that the further transmission of the desired command torque $M_{mot.1}$ takes place in a time-delayed manner. The block 1012 can therefore be configured as a simple delay component having an adjustable delay.

The status signal St is outputted by the transmission control apparatus 16 and indicates the presence of one of three operating states. The first operating state (status signal St1) is characterized by an opened clutch and the second operating state (status signal St2) is characterized by a closed clutch and the third operating state (status signal St3) is characterized by a controlled clutch operation.

The motor 10 is then controlled by block 1013 in such a manner that the modified desired command torque $M_{mot.2}$ is realized.

FIG. 3b is a flowchart showing the function of the block 1012. After the start step, the status signal St is read in. The function "drivetrain damping" is only then activated when the state "clutch closed" (status signal St2) is present.

FIGS. 4a to 4d show the function of the transmission control apparatus 16. After the start step, the signals $\Delta Q_i$ and/or $\Delta M_{mot}$ are read in. Then, in the next steps, a check is made as to whether a sign change of the motor torque takes place and/or whether a marked (threshold value SW) change (increase or reduction) of the fuel metering is provided via the motor control apparatus 101. If this is the case, then the clutch is actuated in the direction "open", otherwise, the clutch remains unaffected.

What is important here is that the signals $\Delta Q_i$ and/or $\Delta M_{mot}$ represent the fuel quantity to be metered, that is, the motor torque to be adjusted. The fuel quantity or motor torque is therefore supplied to the transmission control apparatus 16 before the marked changes in motor torque are initiated via the motor control apparatus 101. In this way, the clutch can be opened before changes of the motor torque occur.

The control apparatus 16 forms the drive signal ($P_{wk}$) in dependence upon the signal ($\Delta M_{mot}$) to cause the clutch to at least reduce the power flow between the motor 10 and the wheels 13. The signal ($\Delta M_{mot}$ and/or $|\Delta Q_i|$) indicates whether one of the following is provided:

(a) a change of sign of said motor torque ($M_{mot}$);

(b) an interruption or discontinuous reduction of the fuel metering to the motor ($|\Delta Q_i|$>SW); or, (c) a resumption of fuel metering or an abrupt increase of the metering of fuel ($|\Delta Q_i|$>SW) after said interruption or said abrupt reduction.

Figure 4A:
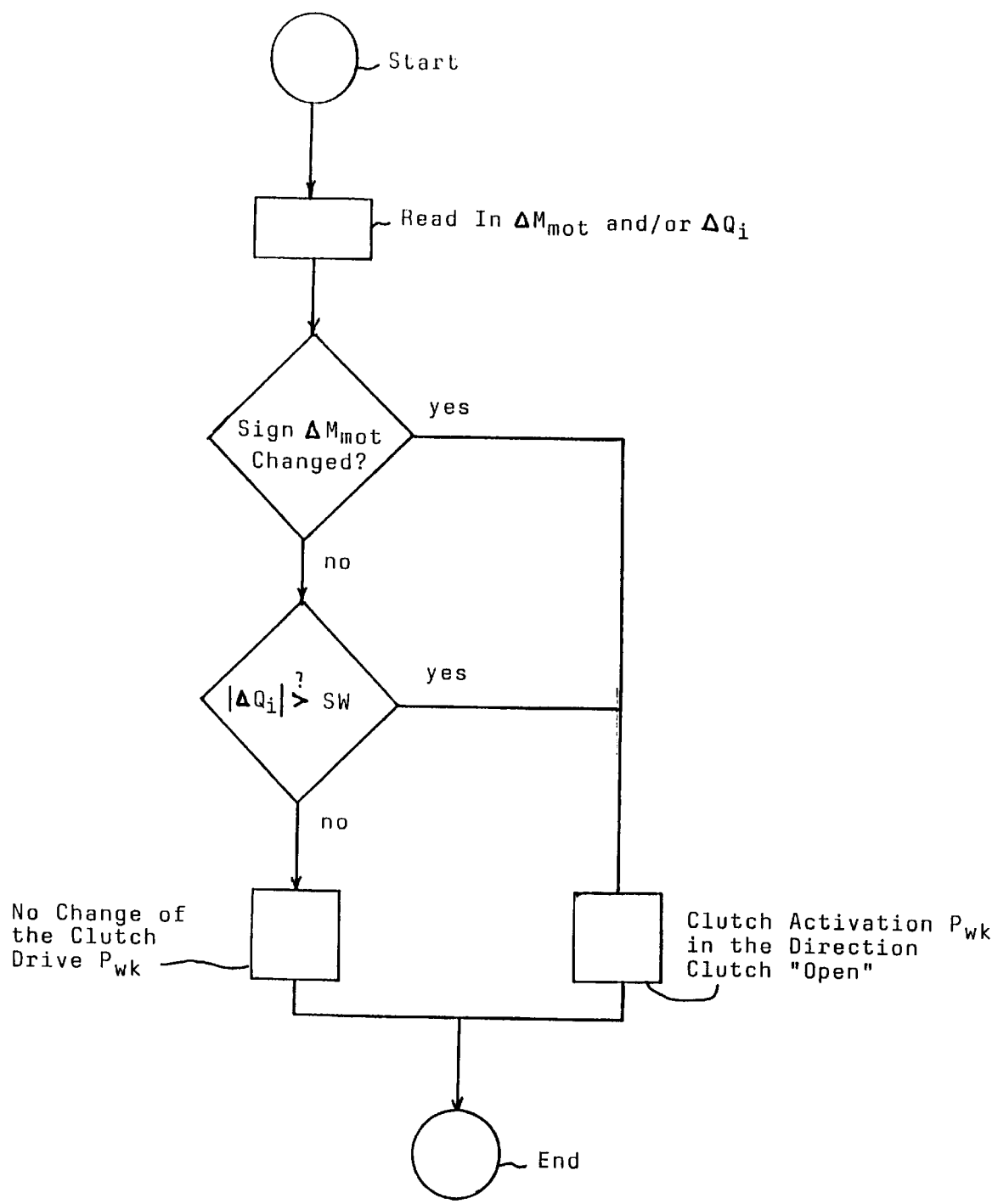
Figure 4B:
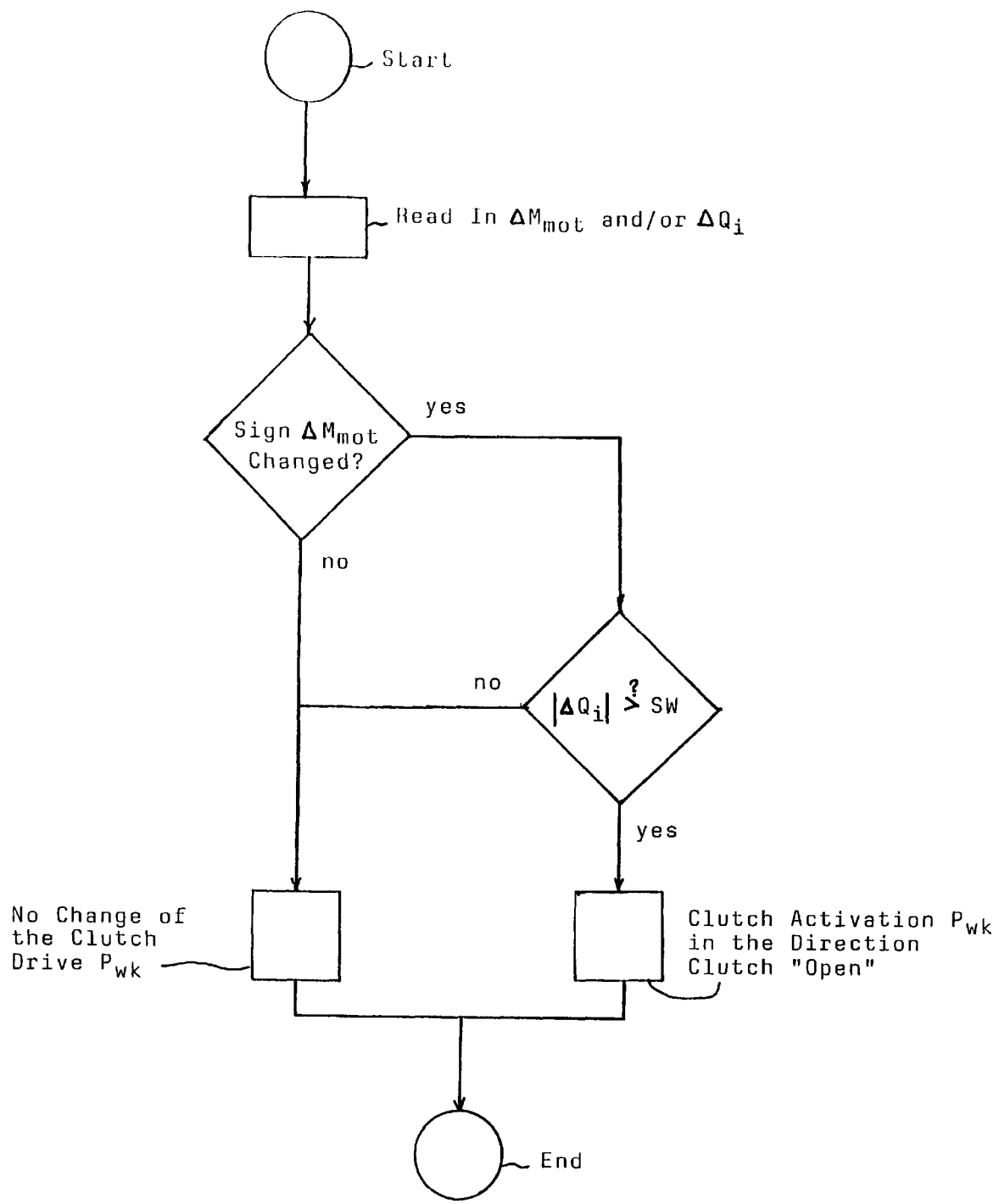
Figure 4C:
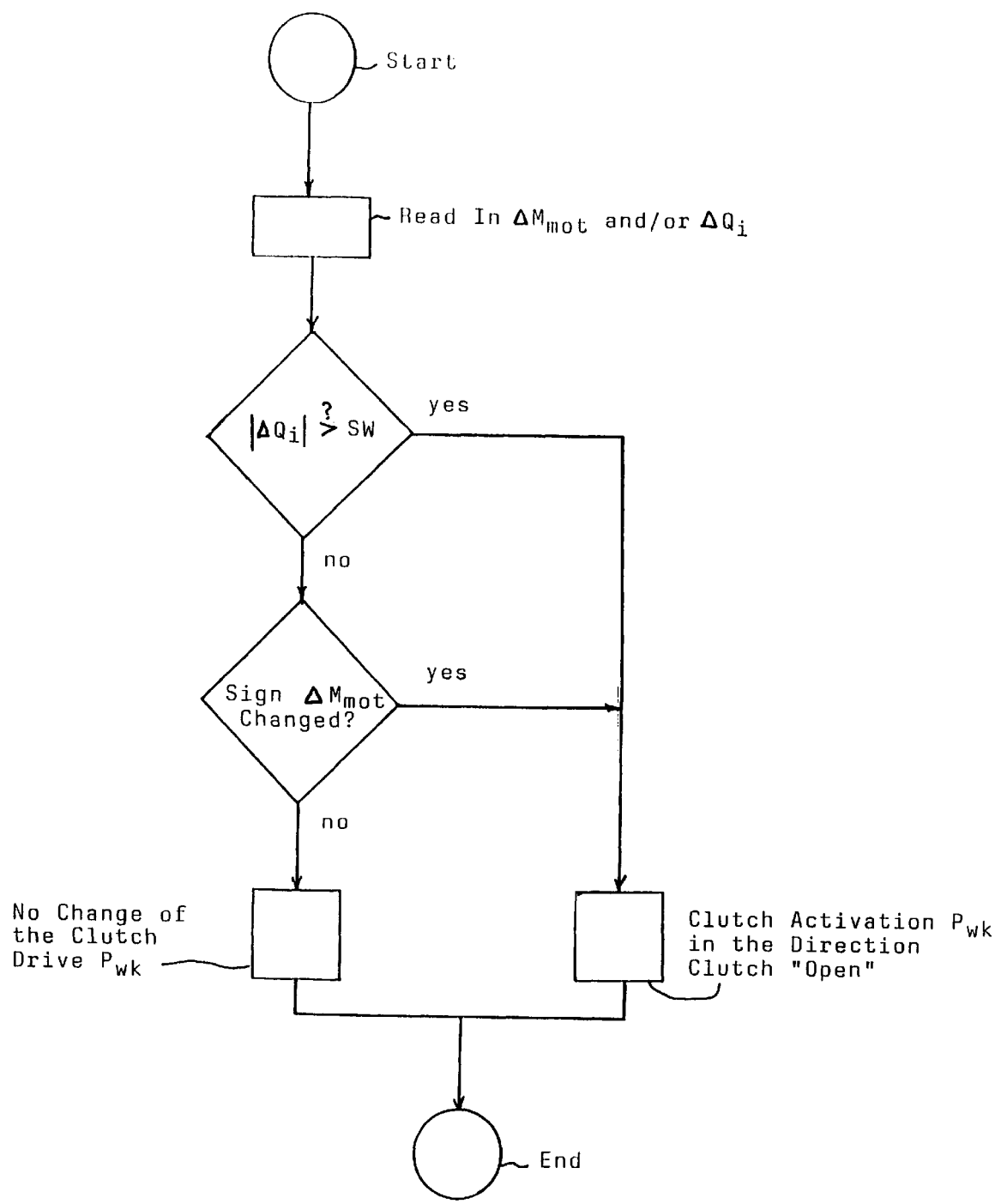
Figure 4D:
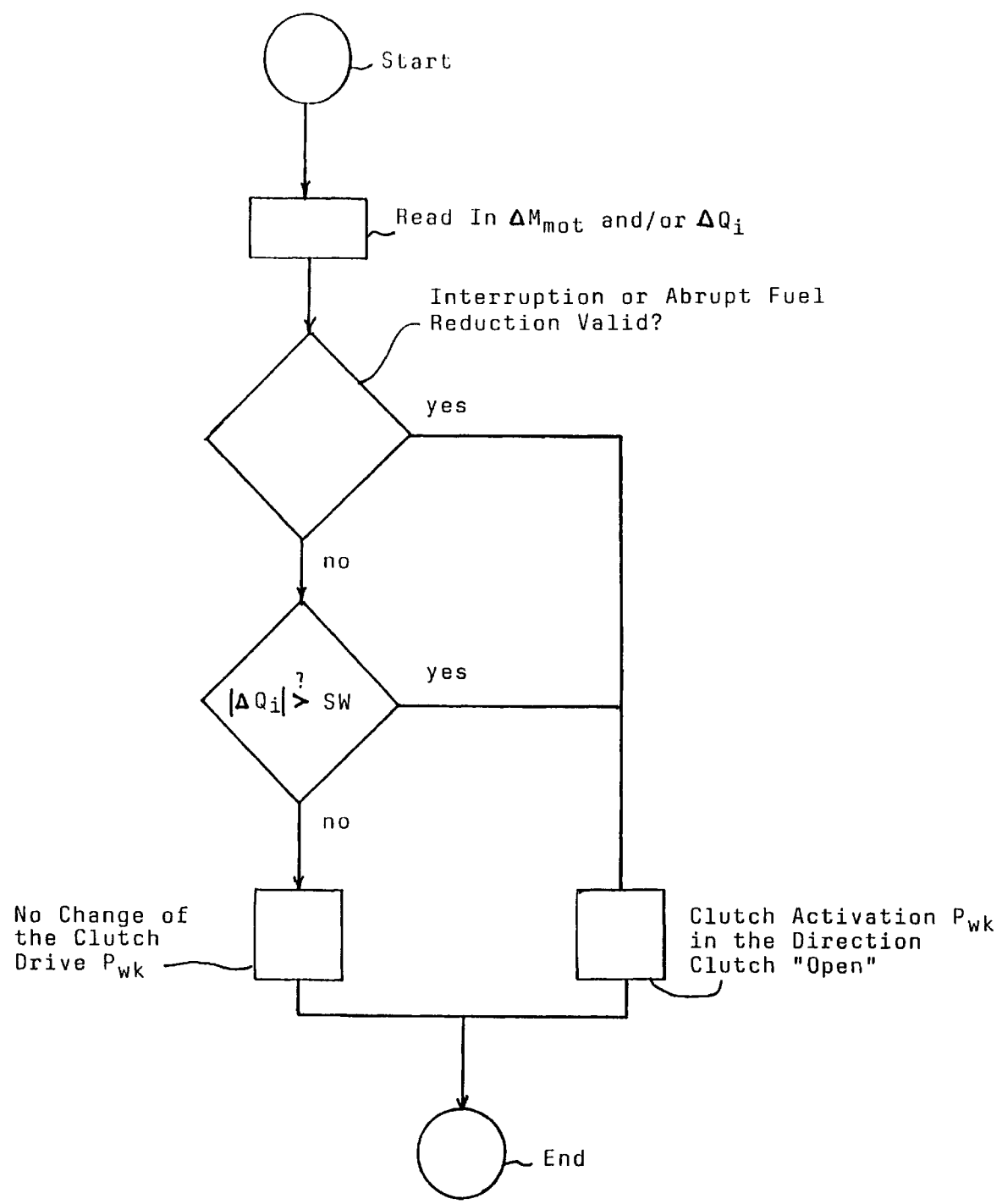

FIG. 4a shows the condition (a) by itself and FIG. 4b conditions (a) and (b). FIG. 4c shows condition (b) by itself and FIG. 4d shows condition (c) by itself.

Although the foregoing has been described with respect to an internal combustion engine, it is conceivable that the system according to the invention could also be applied to other drive units such as an electric motor.

It is understood that the foregoing description is that of the preferred embodiments of the invention and that various changes and modifications may be made thereto without departing from the spirit and scope of the invention as defined in the appended claims.

What is claimed is:

1. A system for controlling a clutch arranged between a motor of a vehicle generating a motor torque ($M_{mot}$) and the wheels thereof, the system comprising:

a first control apparatus in the form of a motor control apparatus for generating a signal ($\Delta M_{mot}$) indicating a change of a specific amount of the motor torque ($M_{mot}$) to be adjusted;

said signal ($\Delta M_{mot}$) indicating whether a change of sign (+/−) of said motor torque ($M_{mot}$) representing transitions from overrun into drive operation is provided; and, a second control apparatus for forming a drive signal ($P_{wk}$) in dependence upon said signal ($\Delta M_{mot}$) to cause the clutch to at least partially open to reduce the power flow between the motor and the wheels when said signal ($\Delta M_{mot}$) indicates that the change of sign (+/−) in said motor torque ($M_{mot}$) is provided thereby avoiding a jolt in the torque transmitted between said motor and said wheels.

2. The system of claim 1, wherein said change is a discontinuous change.

3. The system of claim 1, said first control apparatus being a motor control apparatus configured to control said motor torque ($M_{mot}$); and, said second control apparatus being a transmission control apparatus for controlling said clutch; and, said signal ($\Delta M_{mot}$) being formed in said motor control apparatus and being transmitted to said transmission control apparatus.

4. The system of claim 1, said second control apparatus functioning to form said drive signal ($P_{wk}$) in response to said change of said motor torque so as to change said power flow so that the rigid connection between said motor and said wheels is interrupted.

5. The system of claim 1, further comprising a torque converter interposed between said motor and said wheels; and, said clutch being connected so as to bridge said torque converter.

6. The system of claim 1, said clutch being a servo-clutch.

* * * * *